United States Patent
Ackley et al.

(10) Patent No.: US 9,245,492 B2
(45) Date of Patent: Jan. 26, 2016

(54) DUAL SCREEN DISPLAY FOR MOBILE COMPUTING DEVICE

(71) Applicant: Intermec IP Corp., Everett, WA (US)

(72) Inventors: Sprague Ackley, Seattle, WA (US); Paul Maltseff, Woodinville, WA (US)

(73) Assignee: Intermec IP Corp., Everett, WA (US)

( * ) Notice: Subject to any disclaimer, the term of this patent is extended or adjusted under 35 U.S.C. 154(b) by 98 days.

(21) Appl. No.: 13/791,779

(22) Filed: Mar. 8, 2013

(65) Prior Publication Data

US 2014/0002365 A1    Jan. 2, 2014

Related U.S. Application Data

(60) Provisional application No. 61/665,720, filed on Jun. 28, 2012.

(51) Int. Cl.
G09G 5/00 (2006.01)
G02F 1/167 (2006.01)
H04M 1/22 (2006.01)
G06F 3/14 (2006.01)

(52) U.S. Cl.
CPC .......... G09G 5/006 (2013.01); G02F 1/167 (2013.01); H04M 1/22 (2013.01); G06F 3/1438 (2013.01); G09G 2300/023 (2013.01); G09G 2354/00 (2013.01); G09G 2360/04 (2013.01); H04M 2250/12 (2013.01); H04M 2250/16 (2013.01)

(58) Field of Classification Search
CPC ..... G06F 3/1446; G06F 3/147; G06F 3/1438; G09G 2300/026; G09G 5/006; G09G 2354/00; G09G 2300/023; G09G 2300/04; G02F 1/167

USPC ............... 345/1.1–1.3, 2.2, 3.3–3.4
See application file for complete search history.

(56) References Cited

U.S. PATENT DOCUMENTS

| | | | |
|---|---|---|---|
| 6,318,636 B1 * | 11/2001 | Reynolds et al. | 235/472.01 |
| 7,236,151 B2 | 6/2007 | Doane et al. | |
| 7,773,064 B2 | 8/2010 | Doane et al. | |
| 7,884,815 B2 | 2/2011 | Fraser et al. | |
| 2004/0227730 A1 * | 11/2004 | Sugihara | 345/157 |

(Continued)

OTHER PUBLICATIONS

Robert D Sorkin, Thomas R Mabry, Mary Susan Weldon, Greg Elvers, Integration of information from multiple element displays; University of Florida U.S.A., U.S. Air Force Academy U.S.A., University of California, Santa Cruz, U.S.A., University of Dayton, Received Aug. 17, 1989; Available online Jul. 27, 2004 pp. 167-187 (21 pages).

(Continued)

*Primary Examiner* — Md Saiful A Siddiqui
(74) *Attorney, Agent, or Firm* — Additon, Higgins & Pendleton, P.A.

(57) ABSTRACT

A mobile computing device is disclosed for displaying backlight and diffuse reflecting information. The mobile computing device is configured to include a processor, a first LCD display unit connected to the processor, and a second diffuse reflecting display unit connected to the processor. The mobile computing device is further provided with a display panel interface, such as a mouse or a gravity detecting device like an accelerometer, configured to detect a property for activating a display type. The processor is configured to send information to be displayed to the first display unit or the second display unit or both depending on the display type property detected.

15 Claims, 12 Drawing Sheets

(56) References Cited

U.S. PATENT DOCUMENTS

| | | | | |
|---|---|---|---|---|
| 2009/0295731 | A1* | 12/2009 | Kim et al. | 345/168 |
| 2010/0184485 | A1* | 7/2010 | Kim | 455/566 |
| 2010/0302194 | A1* | 12/2010 | Park et al. | 345/173 |
| 2011/0124376 | A1* | 5/2011 | Kim et al. | 455/566 |
| 2011/0260987 | A1* | 10/2011 | Zhao et al. | 345/173 |
| 2012/0032972 | A1* | 2/2012 | Hwang | 345/592 |
| 2013/0050164 | A1* | 2/2013 | Rericha | 345/205 |

OTHER PUBLICATIONS

Samsung unveils Android Smartphone with two displays, available at http://www.conceivablytech.com/3973/products/samsung-unveils-android-smartphone-withtwo-displays, Nov. 2009, 3 pages.

Apple MacBook with Transparent Display, available at http://www.2dayblog.com/2008/11/05/apple-macbook-with-transparent-display/ 2008, four pages.

Transparent double-sided touchscreen display Android smartphone prototype, May 31, 2012, 4 pages.

Motorola Razr V3 cellular phone, available at http://www.google.com/products/cataloghl=en&rlz=1G1SNYR_ENDE414&q = motorola+razr&um=1&ie=UTF-8&tbm=shop&cid=8520215816951931252&sa=X&ei=MHTXT7aPLITCswaS7cGdDw&ved=0CI8BEPMCMAc#ps-sellers May 2007, 2 pages.

Barnes and Noble dual screen Nook, available at http://gizmodo.com/5385938/barnes--nobles-dual+screen-nook-260-eats-the-kindles-lunch, Oct. 20, 2009, 3 pages.

Robert D Sorkin , Thomas R Mabry, Mary Susan Weldon, Greg Elvers, Integration of information from multiple element displays; University of Florida U.S.A., U.S. Air Force Academy U.S.A., University of California, Santa Cruz, U.S.A., University of Dayton, Received Aug. 17, 1989; Available online Jul. 27, 2004 pp. 161-167 Abstract only available.

* cited by examiner

DUAL SCREEN DISPLAY FOR MOBILE COMPUTING DEVICE

TECHNICAL FIELD

The present disclosure relates to mobile computing devices and more particular to displays for a mobile computing device.

BACKGROUND

High demand exists for mobile computing devices that can be used anywhere anytime. One limitation placed on this demand are the displays used in these devices.

Conventional mobile computing devices use backlit displays to display text or an image. One such display is a liquid crystal display. These displays use a variety of liquid crystal substances that have a unique feature of being affected by electrical current. For example, a particular form of liquid crystal is the nematic liquid crystal called twisted nematics which are naturally twisted. Applying an electric current to these crystals will untwist them to varying degrees depending on the voltage. Because the crystals react predictably to electric current, the electric current can be used to control the passage of light through the crystal.

Liquid crystals do not emit light of their own. External lighting must be applied to the crystal in order that light from the crystal can be seen. Backlighting may be provided by any light source such as a fluorescent tube, LEDs, lasers, or other sources of light. In conventional backlit displays used on mobile computing devices, the computer display is typically lit with built-in fluorescent tubes typically located behind the LCD. Depending upon the orientation of the liquid crystals under the influence of an applied voltage, there is more light or less backlight that is allowed to pass through the crystals. That provides the dark and light points of light coming from the liquid crystal display that together form the text or image that is seen on the display screen by the user.

The readability of back lit displays is generally inversely proportional to ambient light. This is because the lighting for a backlit display comes from the backlight. When the ambient light is dark or where lighting is scarce, there is no or little light reflecting off the liquid crystal display to interfere with the backlighting that is shining through the liquid crystal display. For that reason, a backlit display can be easily read in the dark or where lighting is scarce. Where, however, the ambient light is too strong, the readability of the backlit display degrades on account of the interference between the strong ambient light reflecting off of the liquid crystal display and the backlight that is coming from the liquid crystal display. In addition, the human eye responds to high ambient light by closing the iris resulting in making the light in the back light display appear dimmer. For these reasons, backlit displays are difficult to read when the ambient or outdoor light is strong. In direct sunlight, such as on the beach, the interference may be so great that the backlit display may be impossible to read.

A relatively new technology for displaying text and images that is becoming increasing popular on account of e-books is electronic paper. Electronic paper, e-paper and electronic ink are display technologies which are designed to mimic the appearance of ordinary ink on paper. Unlike conventional backlit flat panel displays which emit light, electronic paper displays reflect light like ordinary paper. Other applications of electronic visual displays include electronic pricing labels in retail shops, and digital signage, time tables at bus stations, electronic billboards, and e-paper magazines. Some devices, like USB flash drives, even use electronic paper to display status information, such as available storage space. E-ink is less popular with cell phones although Motorola makes one cell phone with an e-ink display known as the E3.

Diffuse reflecting technology, such as e-ink, is particularly useful for e-books because it has low refresh rates compared to other low-power display technologies, such as LCD. The low refresh rates allow for a more stable image, since there is no need to refresh the image constantly which can make an e-ink display more comfortable to read. The low refresh rates also reduce the power requirements for displaying text and images. Indeed, some e-ink technologies require very little or no refresh at all and so can even hold the static text and images indefinitely without using electricity, except when changing to another image. The technology of e-ink can also allow for a wider viewing angle than is possible with an LCD display.

The low refresh rate possible with e-ink however makes e-ink displays not well suitable for sophisticated interactive applications, such as fast moving menus, mouse pointers or scrolling. For example, a document displayed using e-ink cannot be zoomed quickly or smoothly without some blurring. This is one reason why computing devices such as laptops, tablets, and mobile devices tend to use LCD displays and not e-ink for the display Both the LCD and the e-ink displays illustrate how conventional computing devices are indeed limited by their display to when and where they can be used. The readability of e-ink displays improve with stronger ambient light while the readability of LCD displays degrades in those conditions. The LCD displays are most readable when there is low or no ambient light. The e-ink displays cannot be read in those conditions. The low refresh rates for e-ink allow for a more stable image. However, those low refresh rates inhibit the use of e-ink with sophisticated interactive applications. The paradox is that when outside and the sun is shining, one person is unable to see a thing on his backlit computer while the other is reading his book on a Kindle™ with the e-ink. Similarly, a delivery woman has no problem reading the e-ink on an e-ink display. But she has to take off her sunglasses and shelter the display from the direct sunlight in order to see anything on a backlit display.

There is a need to meet the high demand for mobile computing devices that can be used anywhere anytime under wider lighting conditions, with more sophisticated interactive applications, and with lower power requirements. This disclosure addresses that need.

SUMMARY OF THE INVENTION

A mobile computing device is disclosed for displaying backlight and diffuse reflecting information. The mobile computing device is configured to include a processor, a first display unit connected to the processor, and a second display unit connected to the processor. The mobile computing device is further provided with a display panel interface configured to detect a property for activating a display type. The processor is configured to send information to be displayed to the first display unit or the second display unit or both depending on the display type property detected. Illustratively, the first display unit is configured to provide a backlit display and the second display unit is configured to provide a diffuse reflecting display.

The display panel interface of the mobile computing device may be a touch activated sensor and the property detected for activating the display type may be a touch detected by the sensor. Illustratively, the touch activated sensor may include a first touch activated sensor associated with the first display unit and a second touch activated sensor associated with the second display unit, wherein the touch detected by the touch activated sensor is a touch detected by the first touch activated sensor or a touch detected by the second touch activated sensor, and wherein the touch detected by the first touch activated sensor activates the first display unit and the touch detected by the second touch activated sensor activates the second display unit.

Alternatively, the display panel interface may include a touch activated sensor that detects the form of the touch—such as by the number of times that the touch activated sensor is touched or the number of fingers touching the touch activated sensor—and then activates the display type depending upon the form of the touch. Illustratively, a first number of times of touch of the touch activated sensor may activate the first display unit and a second number of times of touch of the touch activated sensor may activate the second display unit. Alternatively, a first number of fingers touching the touch activated sensor may activate the first display unit and a second number of fingers touching the touch activated sensor may activate the second display unit.

In some embodiments, the display panel interface is a gravity detection device, such as an accelerometer, and the property detected for activating the display type depends on which of the first display unit or the second display unit is facing in the upward direction.

The mobile computing device may be further provided with a display controller having display controller settings, wherein the processor is configured to update the display controller based on the display type property detected. A memory associated with the mobile computing device may also be configured to store properties of the backlit display and the diffuse reflecting display.

The mobile computing device may be a hand held terminal, a laptop computer, a smart phone, or any mobile computing device. In an illustrative embodiment, the display unit is configured to serve as a mouse.

In an illustrative embodiment, the first display unit may be located on a first side of the mobile computing device and the second display unit may be located on a second side of the mobile computing device. Illustratively, the first side of the computing device may be the front of the mobile computing device and the second side of the computing device may be the back of the computing device. In another illustrative example, the second display unit is configured to serve as a mouse. Alternatively, the second display unit may be configured to serve as a mouse pad. According to this disclosure, a mouse is defined to be "a stand-alone device used for navigation purposes" as opposed to a "mouse pad" which is defined to be "a flat touch-sensitive device used for navigation purposes." Alternatively, the first display unit and the second display unit of the mobile computing device may be located on the same side of the mobile computing device. In an illustrative example, the side of the mobile computing device on which the first display unit and the second display unit are located may be the front side of the mobile computing device. In other embodiments, the first display unit configured to provide a back lit display and the second display unit configured to provide a diffuse reflecting display may be integrated into a single display package so that one overlays the other. In some embodiments, the diffuse reflecting display of the second display unit may be configured to provide a diffuse reflecting display of dashboard information.

In other embodiments, the mobile computing device is in the form factor of a clam shell including a display part and a keyboard part. The first display unit and the second display unit may reside in the display part in this embodiment and may be rotatable about a swivel member connecting the display part to the keyboard part when the display part is in a position that is orthogonal to the keyboard part. The swivel member allows either the first display unit or second display unit to face in the direction of the keyboard part of the mobile computing part for use in a first set of operations. The display unit facing away from the keyboard part of the mobile computing device may be used in a second set of operations even contemporaneously with the first of operations that are being performed using the display unit facing toward the keyboard part of the computing device. In another embodiment, the display unit facing away from the keyboard part of the mobile computing device may become the display face of the mobile computing device when the display part is closed onto the keyboard part of the mobile computing device. In an illustrative embodiment, the display unit facing away from the keyboard and that becomes the face of the mobile computing device when the display part is closed against the keyboard part serves as a tablet.

In an illustrative method of displaying information from a mobile computing device includes detecting a property for activating a display type; and sending information to be displayed to a first display unit or a second display unit depending on the display type property detected. In an illustrative embodiment, the method further includes the steps of configuring the first display unit to provide a backlit display; and configuring the second display unit to provide a diffuse reflecting display.

Other embodiments are also disclosed.

BRIEF DESCRIPTION OF THE DRAWINGS

FIG. 13 also shows an accelerometer used to provide another display panel interface.

DETAILED DESCRIPTION

Figure 1:
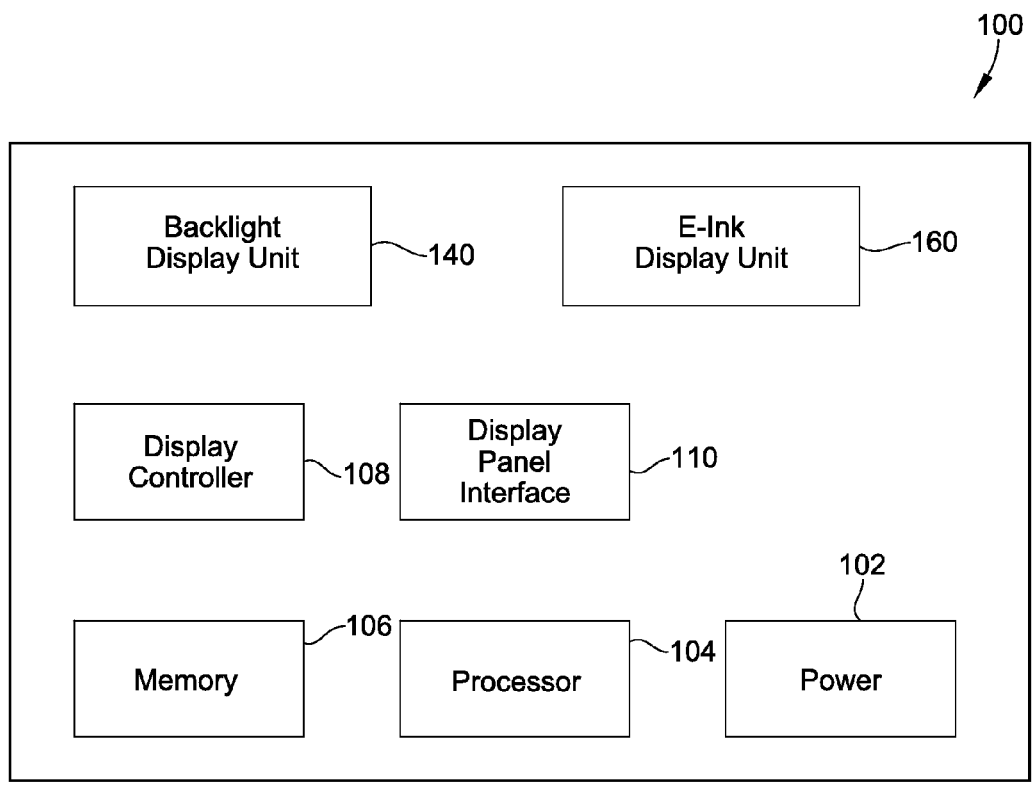
FIG. 1 shows a functional diagram of a mobile computing device according to this disclosure.

A mobile computing device is disclosed for displaying backlight and diffuse reflecting information. The mobile computing device is configured to include a processor, a first display unit connected to the processor, and a second display unit connected to the processor. The mobile computing device is further provided with a display panel interface configured to detect a property for activating a display type. The processor is configured to send information to be displayed to the first display unit or the second display unit or both depending on the display type property detected. In an illustrative example wherein the processor is configured to send information to both display units, the processor may send text or image data on a particular subject to one display unit while providing the other display unit with an animated logo or company information for display. Illustratively, the first display unit is configured to provide a backlit display and the second display unit is configured to provide diffuse reflecting display.

The display panel interface of the mobile computing device may be a touch activated sensor and the property detected for activating the display type may be a touch detected by the sensor. Illustratively, the touch activated sensor may include a first touch activated sensor associated with the first display unit and a second touch activated sensor associated with the second display unit, wherein the touch detected by the touch activated sensor is a touch detected by the first touch activated sensor or a touch detected by the second touch activated sensor, and wherein the touch detected by the first touch activated sensor activates the first display unit and the touch detected by the second touch activated sensor activates the second display unit.

Alternatively, the display panel interface may include a touch activated sensor that detects the form of the touch— such as by the number of times that the touch activated sensor is touched or the number of fingers touching the touch activated sensor—and then activates the display type depending upon the form of the touch. Illustratively, a first number of times of touch of the touch activated sensor may activate the first display unit, a second number of times of touch of the touch activated sensor activating the second display unit, and a third number of times activates both displays. Alternatively, a first number of fingers touching the touch activated sensor may activate the first display unit and a second number of fingers touching the touch activated sensor may activate the second display unit.

In some embodiments, the display panel interface is a gravity detection device, such as an accelerometer, and the property detected for activating the display type depends on which of the first display unit or the second display unit is facing in a particular direction, such as in a generally upward direction.

The mobile computing device may be further provided with a display controller having display controller settings, wherein the processor is configured to update the display controller based on the display type property detected. A memory associated with the mobile computing device may also be configured to store properties of the backlit display and the diffuse reflecting display.

The mobile computing device may be a hand held terminal, a laptop computer, a smart phone, or any other mobile computing device. In an illustrative embodiment, one display unit is configured to serve as a stand alone mouse device. Alternatively, the display unit may be configured to serve as a flat touch-sensitive device known as a mouse pad.

In an illustrative embodiment, the first display unit may be located on a first side of the mobile computing device and the second display unit may be located on a second side of the mobile computing device. Illustratively, the first side of the computing device may be the front of the mobile computing device and the second side of the computing device may be the back of the computing device. In another illustrative example, the second display unit is configured to serve as a mouse or a mouse pad. Alternatively, the first display unit and the second display unit of the mobile computing device may be located on the same side of the mobile computing device. In an illustrative example, the side of the mobile computing device on which the first display unit and the second display unit are located may be the front side of the mobile computing device. In other embodiments, the first display unit configured to provide a back lit display and the second display unit configured to provide a diffuse reflecting display may be integrated into a single display package so that one overlays the other. In some embodiments, the diffuse reflecting display of the second display unit may be configured to provide a diffuse reflecting display of dashboard information.

In other embodiments, the mobile computing device is in the form factor of a clam shell including a display part and a keyboard part. The first display unit and the second display unit may reside in the display part in this embodiment and may be rotatable about a swivel member connecting the display part to the keyboard part when the display part is in a predetermined position, such as being generally orthogonal to the keyboard part. The swivel member allows either the first display unit or second display unit to face in the direction of the keyboard part of the mobile computing part for use in a first set of operations. The display unit facing away from the keyboard part of the mobile computing device may be used in a second set of operations even contemporaneously with the first of operations that are being performed using the display unit facing toward the keyboard part of the computing device, such as displaying advertising or a logo. In another embodiment, the display unit facing away from the keyboard part of the mobile computing device may become the display face of the mobile computing device when the display part is closed onto the keyboard part of the mobile computing device. In an illustrative embodiment, the display unit facing away from the keyboard and that becomes the face of the mobile computing device when the display part is closed against the keyboard part serves as a tablet.

In an illustrative method of displaying information from a mobile computing device includes detecting a property for activating a display type; and sending information to be displayed to a first display unit or a second display unit or both depending on the display type property detected. In an illustrative embodiment, the method further includes the steps of configuring the first display unit to provide a backlit display; and configuring the second display unit to provide a diffuse reflecting display.

The foregoing has described generally the disclosure. We now turn to elaborating features of this disclosure.

FIG. 1 is a functional diagram of a mobile computing device 100. Mobile computing device 100 according to this disclosure includes a processor 104; a first display unit 140 connected to the processor; a second display unit 160 connected to the processor; and a display panel interface 110. The mobile computing device further includes a display controller 108, a memory 106, and a source of power 102. While FIG. 1 shows a processor 104, it will be appreciated that more than one processor may also be used in accordance with this disclosure.

Mobile computing device 100 can be a handheld terminal, a lap top computer, a smart phone, a handheld personal digital assistant (PDA), a wireless mobile phone, a pager, an industrial grade mobile computer with scanning functionality (e.g., bar code scanning, image capture, optical character recognition (OCR), etc.), or any other mobile computing device.

Processor 119 can be any microprocessor capable of accessing information stored in memory unit 106, performing actions based on instructions using information from memory unit 106 or some other source, and alternatively storing information in memory unit 106 or transmitting information. An example of transmitting information can be sending information to be displayed on first display unit 140 or second display unit 160.

Power source 102 can be a battery or fuel cell, a direct line from a wall outlet, current from a solar cell or any other power source sufficient to satisfy the power requirements for mobile computing device 100. Memory unit 106 can be any form of data storage. It may be at least one of random access memory (RAM) and/or read only memory (ROM). Information can be stored permanently until overwritten and/or stored temporarily for use while the unit is active.

Display unit 140 and display unit 160 can include a visual display capable of displaying data transmitted from processing unit 104. Display unit 140 and 160 can include a LCD screen, e-paper, or other bi-stable display, a CRT display or any other type of visual display.

Figure 2:
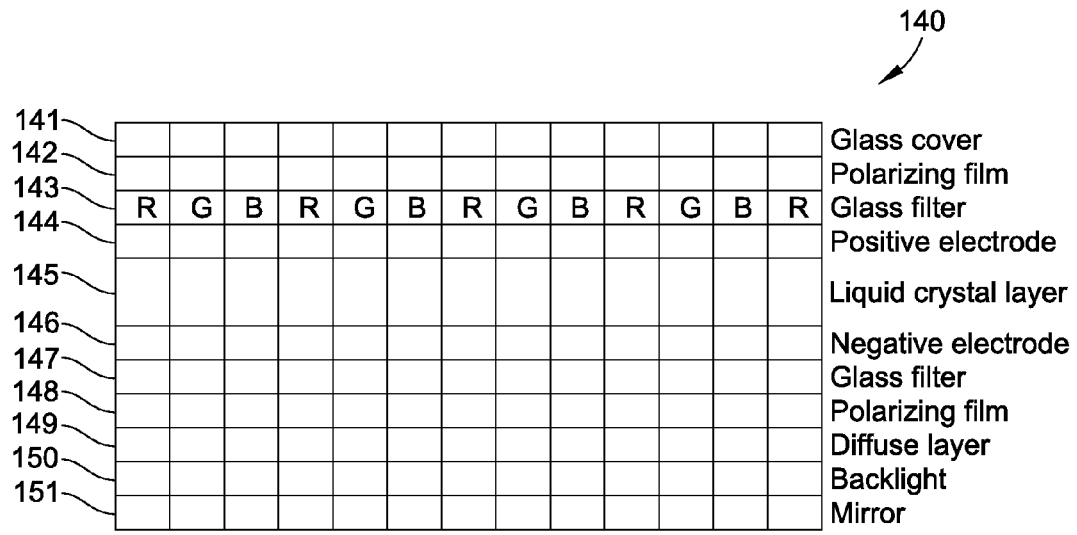
FIGS. 2 and 3 show an illustrative cross-section and aerial view, respectively, of a backlit display useable with this disclosure

Illustratively, display unit 140 is an LCD backlit display and display unit 160 is an e-ink display. Alternatively, display unit 140 may be any other light emitting display known in the art and display unit 160 may be any diffuse reflecting display (i.e., a display based upon diffuse reflecting technology). An illustrative cross-section of a backlit display 140 useable with this disclosure is shown in FIG. 2. The LCD display 140 is a illustratively a layered panel 140 comprising a glass cover 141 overlaying a polarizing film 142 overlaying a glass filter 143 overlaying a positive electrode 144. A liquid crystal layer 145 is sandwiched between the positive electrode 144 and a negative electrode 146. The negative electrode 146 overlays a glass filter 147 overlaying polarizing film 148 overlaying a diffuse layer 149. A backlight 150 lies between the diffuse layer 149 and a mirror 151. Illustratively, backlight 150 is a fluorescent lamp but backlight 150 may be other sources of light such as LEDs, lasers, or any other source of light. Light from backlight 150 contacts diffuse layer 149 directly or indirectly off mirror 151. Diffuse layer scatters the incoming light to create a diffuse light source. The diffuse light polarized by the polarizing film 148 passes through glass filter 147 through liquid crystal layer 145, through glass filter 143, polarizing film 142, and finally is emitted from display unit 140 through glass cover 141. The display visible from display unit 140 will a be light pattern that has been modulated by liquid crystal layer 145 under the action of voltage that is applied to the liquid crystal layer 145 across positive electrode 144 and negative electrode 146 in a manner well known in the art.

Figure 3:
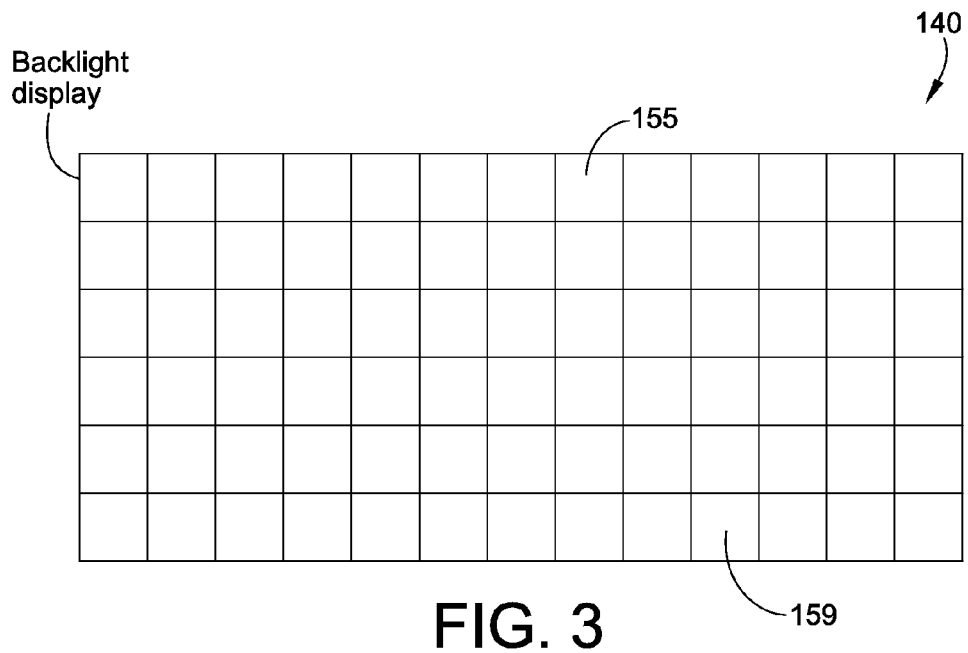

FIG. 3 shows an aerial view of the display unit 140 illustrating that the display unit 140 is configured to form pixels which are the areas defined by the vertical and horizontal lines shown in the FIG. 3. Two pixels 155 and 159 have been labeled to illustrate two pixels that make up the grid of pixels shown in the checker-board pattern that makes up the display unit in FIG. 3.

Figure 4:
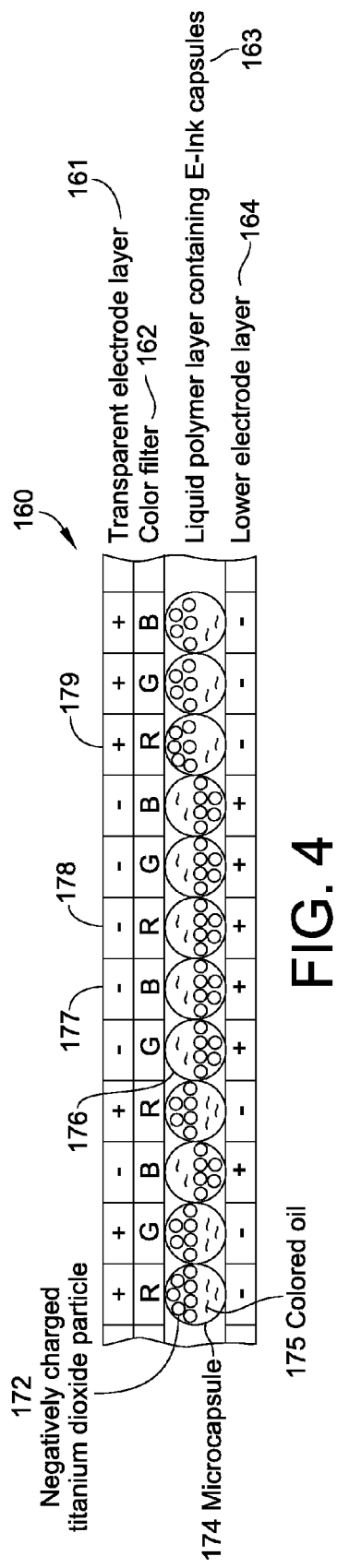
FIGS. 4 and 5 show an illustrative cross-section and aerial view, respectively, of an e-ink display useable with this disclosure
Figure 5:
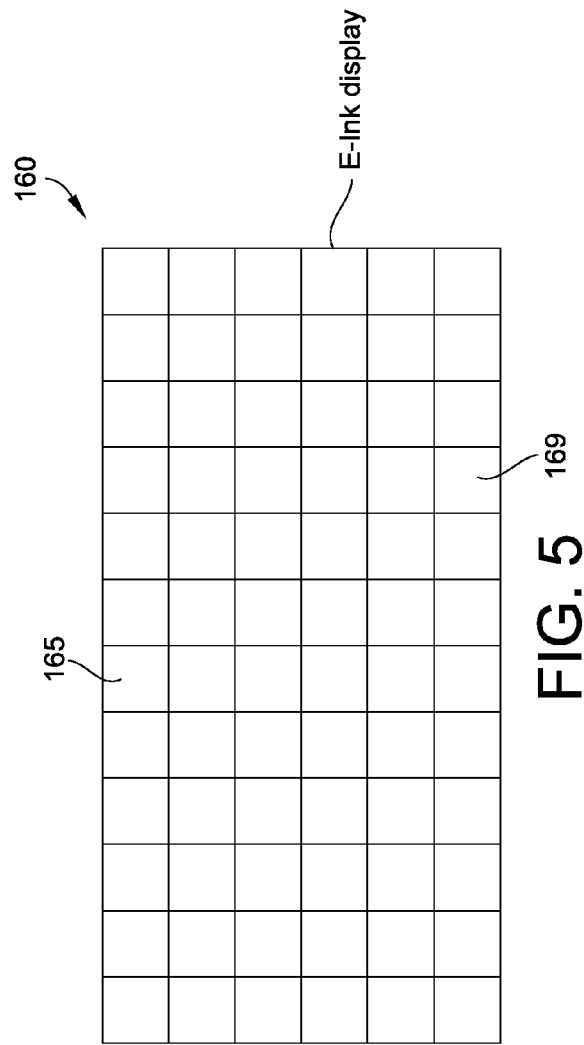

Referring again to FIG. 1, illustratively, display unit 160 is an e-ink display. An illustrative cross-section of an e-ink display 160 useable with this disclosure is shown in FIG. 4. The e-ink display 160 is illustratively a layered panel 160 comprising a transparent electrode layer 161 overlaying a color filter 162. A liquid polymer layer 162 is sandwiched between color filter 162 and lower electrode layer 164. Liquid polymer layer illustratively comprises a microcapsule 174 containing negatively charged titanium dioxide particles 172 and colored oil 175. The display visible from display unit 160 will be a light pattern that has been modulated by liquid polymer layer 163 under the action of voltage that is applied to the liquid polymer layer 163 across electrode 161 and electrode 164. More specifically, the electrodes are defined to have areas 177, 178, 179 which correlate to the pixel areas (as defined in connection with FIG. 4) as shown in FIG. 5. Applying a positive or negative charge onto these areas causes the negatively charged titanium dioxide particles 172 to migrate toward or away from these areas depending on the charge. The attraction of the negatively charged titanium dioxide particles 172 to the positively charged areas of the upper electrode 161 creates a white backdrop contiguous with upper electrode 161 for reflecting incident light. The attraction of the negatively charged titanium dioxide particles 172 to the positively charged areas of the lower electrode 163 causes the colored oil 175 in the microcapsule 174 to lie contiguous to the negatively charged areas of the upper electrode 161. The colored oil creates a dark background contiguous with the upper electrode 161 for producing a dark color. The white and dark colors that make-up the light reflected off the white titanium dioxide and dark oil contiguous the upper electrode is what makes up the displayed text or image of the e-ink display. The above and other diffuse reflecting technology solutions for making diffuse reflector displays useable with this disclosure are well known in the art.

Referring again to FIG. 1, while the illustrative display unit 140 is an LCD display and display unit 160 is an e-ink display, it will be appreciated that a wide array of display types may be used with this disclosure. Display types include, but are not limited to, monochrome displays, color displays, cathode ray tube (CRT) displays, projection displays, liquid crystal displays (LCDs), flat, rigid displays, flexible displays, electronic whiteboard displays, ruggedized displays, weather protected displays, waterproof displays, backlit displays, reflective displays, power saving displays, etc. Other display types well known in the art or not yet produced or conceived are equally applicable as detachable display types that may be used in the application described.

Figure 6:
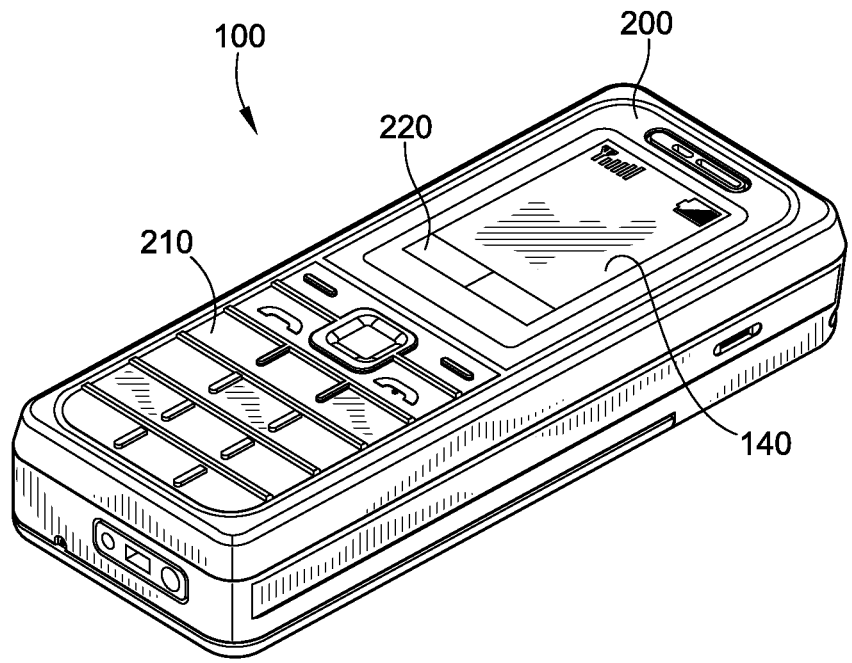
FIGS. 6 and 7 illustrate a mobile computing device illustrated as a smart phone having a front side with a keyboard and a back side, respectively.
Figure 7:
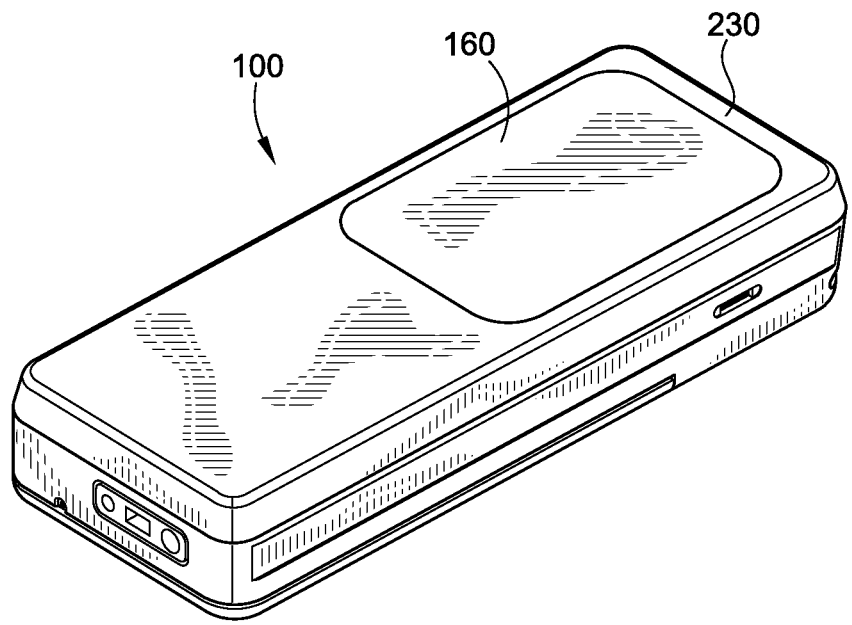

Display unit 140 and display unit 160 may be configured within mobile computing device in a number of ways. FIGS. 6 and 7 illustrate mobile computing device 100 illustrated as a smart phone having a front side 200 with a keyboard 210 and a back side 230. In one illustrative embodiment of this disclosure, display unit 140 is located on the front side 200 of the mobile computing device and display unit 160 is located on the back side 230 of the mobile computing device. In this embodiment, the readability of display unit 160 which illustratively is an e-ink display improves with stronger ambient light while the readability of display unit 140 which illustratively is an LCD display degrades in those conditions. The LCD display of display unit 140 is most readable when there is low or no ambient light where the diffuse reflecting display of display unit 160 cannot be read in those conditions. The two displays together of this disclosure thus expands the lighting conditions under which the mobile computing device can be read. The LCD display of display unit 140 can be used in low lighting conditions while the diffuse reflecting display of display unit 160 can be used where the ambient lighting is high, such as on the beach. When outside and the sun is shining, the user is able to read, for example using the diffuse reflecting display. In darker ambient conditions, the user may defer to using the LCD display. Similarly, a delivery woman can read the e-ink on a diffuse reflecting display in the bright sunlight. In one device she can also use the LCD display in lower lighting conditions for more sophisticated interactive applications where the low refresh rates of the diffuse reflecting display are inhibiting.

With the diffuse reflecting display as part of the mobile computing device, the user always has the option of using the diffuse reflecting display for performing mobile computing device functions in order to extend the life of the mobile computing device based on the charge available to the display from the battery. This is because the diffuse reflecting display requires less power than the LCD display which draws significant power due to the continual need to refresh the display and to produce the back lighting. In cases where the power supply is low and so use of the LCD display is no longer an option, the mobile computing device may display an alert 220 as shown in FIG. 6 of the lower power condition to the user; prompting the user to switch over to use of the diffuse reflecting display as described below. Alternatively, the processor may be programmed to automatically switch sending information to be displayed from the LCD display unit over to the diffuse reflecting display unit on the occurrence of the low power condition. Hence, on the occurrence of the event, the diffuse reflecting display unit will begin displaying the stream of information that the processor previously displayed on the LCD display unit. Either feature may allow the user to continue to perform mobile computing functions on the mobile computing device long after a conventional mobile computing device would have shut down because of the absence of required power to drive the LCD display.

A particularly dangerous failure of a mobile computing device can occur when the LCD display become inactive not because of lower power requirements but because the LCD display has failed. In those cases, the user must resort to some external device to retrieve data from the mobile computing device. For example, the user may tether the mobile computing device to an external display to retrieve that data. Advantageously, the second display unit of this disclosure provides a redundancy back-up display for use in this case. Where an external display or other device is not available at the time that the LCD display fails, the back-up display of this disclosure may provide the only way that a user may be able to extract data from his mobile computing device in that situation.

In some of the illustrative examples, only the diffuse reflecting display unit is active. In some examples, the LCD display unit is deactivated on account of either low power requirements or LCD display unit failure. In another example, the LCD display unit may be deactivated to conserve power when only the diffuse reflecting display unit is needed.

Another benefit of this disclosure is that when the LCD display unit is deactivated on account of low or no power, the text or image displayed on the diffuse reflecting display unit will generally be displayed even if the battery goes low or dead since the diffuse reflecting display requires little or no refresh. Hence, even if the battery goes low or dead, the text or image displayed on the diffuse reflecting display prior to the power cut-off or turn-off of the LCD display unit or the mobile computing device generally remains readable to the user which may provide many benefits. For example, if the image is a bar code of a boarding pass required by a user to check-in at the airport or to pass through a gate to board a flight, the display of the bar code on the diffuse reflecting display will be held on the diffuse reflecting display unit long after the available power of the mobile computing device goes low or dead. This allows the user to have his bar code readable at the airport terminal or gate long after the power of his mobile computing device has gone low or away.

Indeed, this illustrates another power management feature of this disclosure. At the airport, for example, the user may display his boarding pass on the diffuse reflecting display and then turn off his mobile computing device to conserve power or for security or for some other purpose or even accidentally. The diffuse reflecting display will hold the image of his boarding pass for use at the airport while at the same time the mobile computing device is saving power for when it may next be needed. The diffuse reflecting display unit of this disclosure may advantageously hold the displayed text or image for any purpose when the mobile computing device is power low or powered down intentionally or unintentionally.

Display of a text or image on a diffuse reflecting display before turn-off of the mobile computing device provides a powerful tool for a user. The diffuse reflecting display may continue to display important information to the user long after power-off. This information may be a boarding pass as in the previous example. It may also be any other information that the user may want to have readily available after power down of the mobile computing device. For example, the diffuse reflecting display may display a flight itinerary after a mobile computing device is powered off, for example to go through security. The diffuse reflecting display may display an agenda for a business or a lunch meeting where the mobile computing device has been or is required to be turned off. The diffuse reflecting display may display a speech that can be used while the mobile computing device is powered off. A passenger on an airplane may even use his mobile computing device to read text or images that were displayed on the diffuse reflecting display unit prior to power down and the passenger may even do so while the plane is taking-off or landing where mobile computing devices are generally required to be powered off due to flight regulations. The disclosure makes this and all other display of information from a mobile computing device after power down possible because the diffuse reflecting display generally holds the text or image displayed even after the mobile computing device has been powered off.

The foregoing and other examples illustrate the flexibility provided by providing a mobile computing device with two display units in according to the disclosure. Either or both displays are available to the user and one or both may be active; thereby expanding the range of use to which a mobile computing device may be put.

The discussion above illustrates the valuable power management capability provided by the multiple display units of this disclosure. The diffuse reflecting display unit provides an alternate display to an LCD display to minimize power usage and extend the use of the mobile computing device when the mobile computing device is operating off a battery. It provides a display for use when there is no longer sufficient power remaining in the mobile computing device battery to drive the LCD display or the mobile computing device. It also provides a backup display in the event that the LCD display fails. This disclosure enables the user to better manage power usage as well as the life of a mobile computing device.

In addition, there may be instances when a user may only need to activate the LCD display unit and not the diffuse reflecting display unit. This disclosure provides for uses of one or both display units depending on the needs of the user.

With the dual display capability provided by the disclosure, a user may throttle between the LCD display and the diffuse reflecting display as needed to perform more sophisticated interactive applications on the LCD display as needed, and less sophisticated operations on the diffuse reflecting display to conserve power usage.

Figure 8:
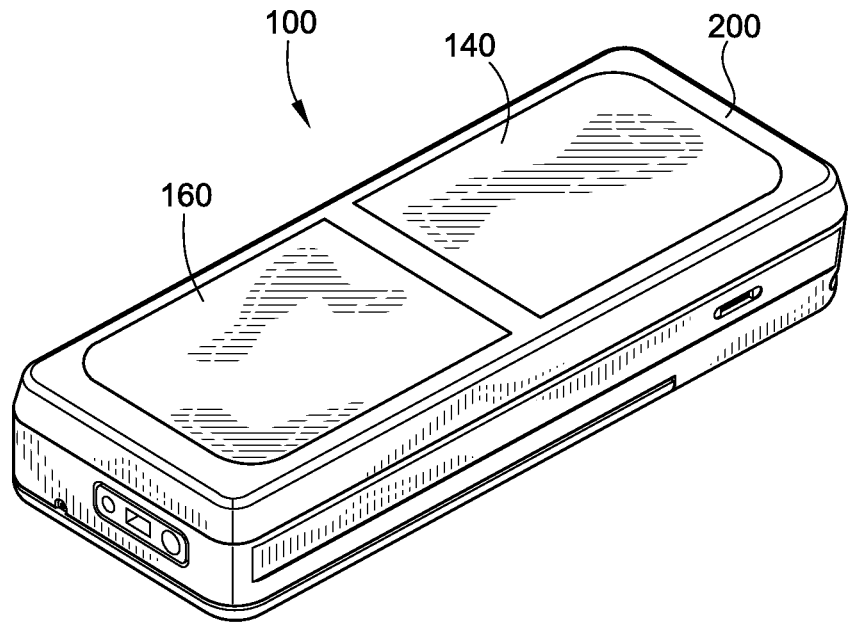
FIG. 8 shows another illustrative embodiment where both the first display unit and the second display unit are located on the same side of the mobile computing device.
Figure 8A:
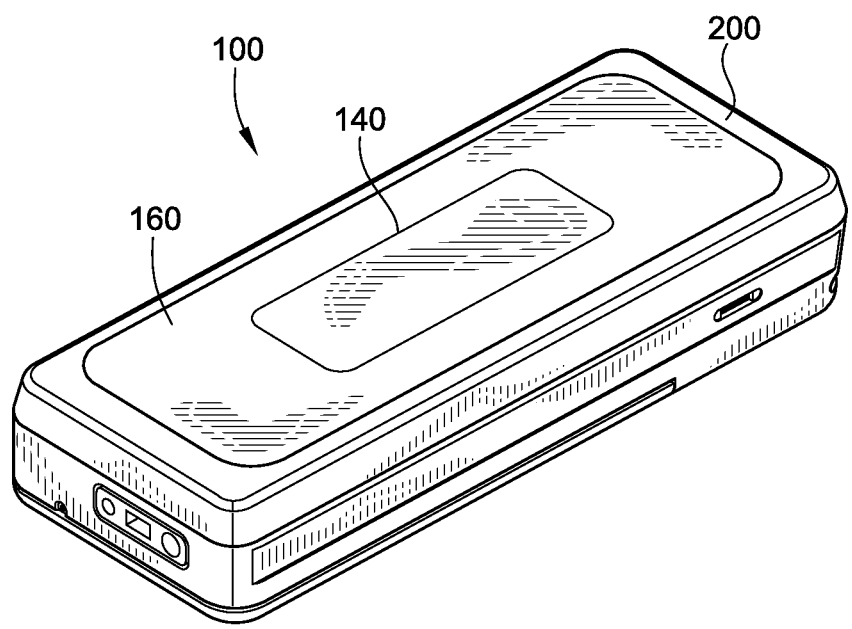
FIG. 8A shows an illustrative embodiment where the second display is configured to frame the first display in a frame configuration.

FIG. 8 shows another illustrative embodiment where both the first display unit 140 and the second display unit 160 are located on the same side of the mobile computing device. By having both LCD and diffuse reflecting displays available, the user can throttle back between displays based on lighting requirements, power availability, and sophistication of the mobile computing function required. FIG. 8A shows an illustrative embodiment where the second display 160, illustratively a diffuse reflecting display, is configured to frame the first display 140, illustratively an LCD display, in a frame configuration.

One of the other benefits served by this disclosure capitalizes on the low refresh and power requirements of the diffuse reflecting display. One of the biggest drains on power usage on a mobile computing device is the use of the computer to determine life data such as time of day, compass location, GPS location, battery availability, etc. It may also include other data for which a low refresh update may be satisfactory such as the temperature, expected highs, weather, stock, or other information for which a low refresh update may be satisfactory.

Figure 9:
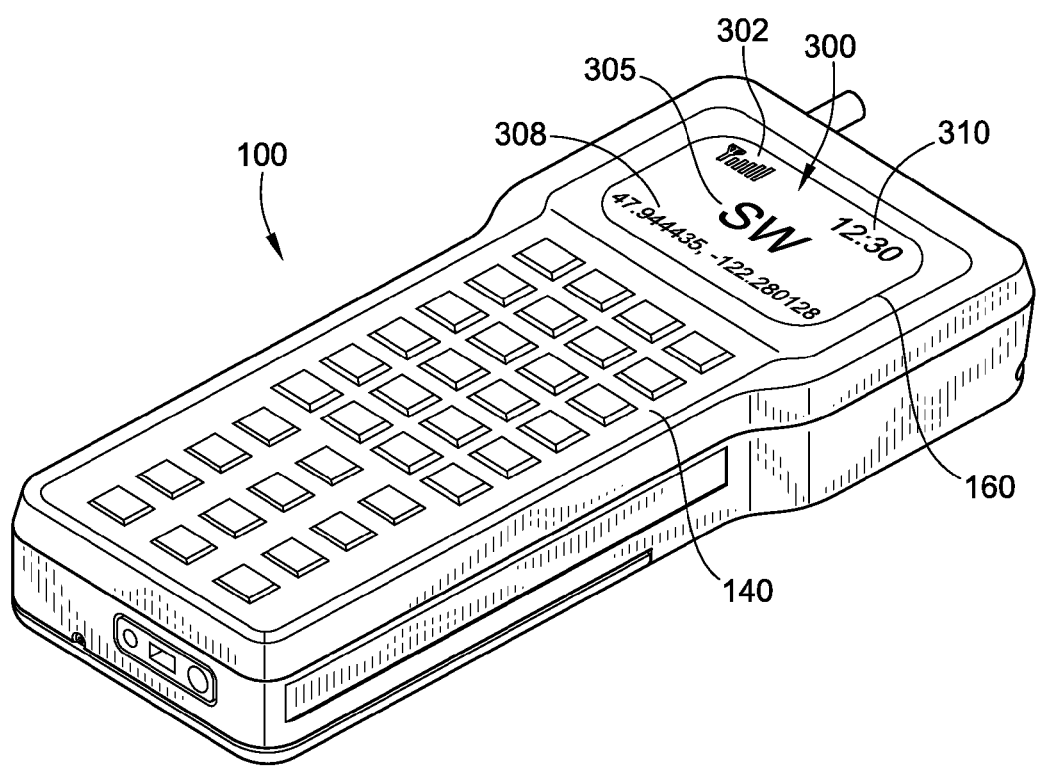
FIG. 9 shows a mobile computing device in the form factor of a handheld terminal with scanner functionality and with both an LCD first display unit and an e-ink second display unit located on the front side of the device and the e-ink display unit displaying a dashboard of life data.

FIG. 9 shows a mobile computing device 100 in the form factor of an industrial grade handheld terminal that is provided with an LCD display 140 and an diffuse reflecting display 160 displaying life data including time of day 310, compass bearing 305, GPS location 308, and power gauge 302. In this example, part or all of the diffuse reflecting display 160 is configured to provide a dashboard 300 of the foregoing and other type of life data. This dashboard of life data is readily available to the user, is always visible on account of diffuse reflecting technology solutions holding its data, and is readily available without draining the battery such as occurs when this life data is retrieved using LCD displays. The LCD display unit 140 which illustratively is displaying a keypad is available to the user for sophisticated mobile computing functions as needed. In the embodiment of FIG. 9, the handheld terminal may also provided with a scanning functionality (not shown) to enable industrial scanning operations.

Figure 10:
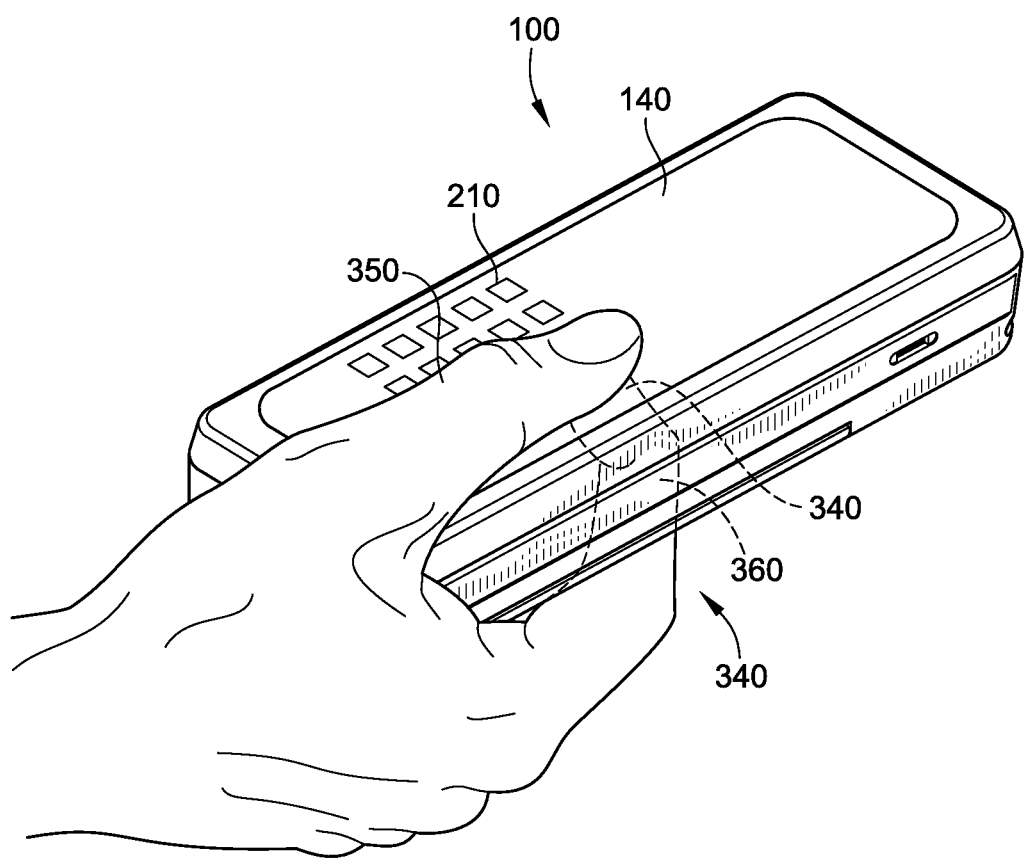
FIG. 10 shows a mobile computing device with a first display unit and a second display unit both LCD displays, and the second display unit configured to serve as a mouse.

FIG. 10 shows the mobile computing device of FIGS. 6 and 7 except that the first display unit 140 and a second display unit 340 are both LCD displays and the second display unit 340 is configured to function as a mouse. Alternatively, the second display unit may be configured to serve as a mouse pad. Illustratively, a keyboard 210 or other active buttons, such as icons, are displayed on display unit 140 which is facing the user for easy navigation and activation using a thumb 350. At the same time, a finger 360 may be used to navigate the mouse or the mouse pad on the back of the mobile computing device. The second display unit detects two-dimensional movement of the finger over the second display unit 340 which processor 104 (shown in FIG. 1) translates into the motion of a pointer that appears on the first display unit 140. This disclosure thus enables thumb and finger action on both front and back side of mobile computing device 100 which is ergonomically friendly and improves computing efficiency.

Figure 11:
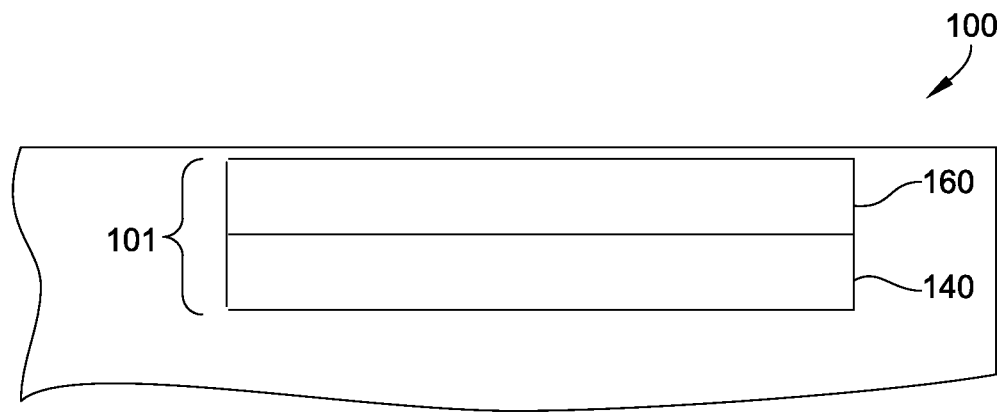
FIG. 11 shows a first display unit configured to provide a back lit display and the second display unit configured to provide an e-ink display integrated into a single display package so that one overlays the other.

In another illustrative embodiment shown in FIG. 11, the first display unit 140 configured to provide a back lit display and the second display unit 160 configured to provide a diffuse reflecting display are integrated into a single display package so as to lay one over the other. In this embodiment, the second display unit 160 overlays display unit 140 in order to allow for the backlighting hardware that is required to generate a display from display unit 140. To display from the LCD display unit 140, the upper display is placed into a "transparent mode" of operation which makes the upper display generally transparent to information that is being displayed from the LCD display unit 140 that lies beneath it. To display from the diffuse reflecting display unit 160, the LCD display unit 140 is preferably inactivated by deactivation of the backlighting and the upper display is placed into an "active" mode of operation in order to make the upper display reflective. In this way, ambient light reflecting off diffuse reflecting display unit 160 exhibits information displayed on the diffuse reflecting display unit 160. Alternatively, the LCD display unit 140 may be placed above diffuse reflecting display unit 140 although placement of the LCD display unit below the diffuse reflecting display unit may be more efficient because it makes more real estate available for the backlight and driving electronics and reduces the path that reflective light has to travel in connection with the diffuse reflecting display unit.

An additional embodiment of the invention comprises a combination of a transparent electronic paper display and using a laser based projecting display similar to the kind developed by Microvision or Fraunhofer Institute for the backlit display unit 140.

Figure 12:
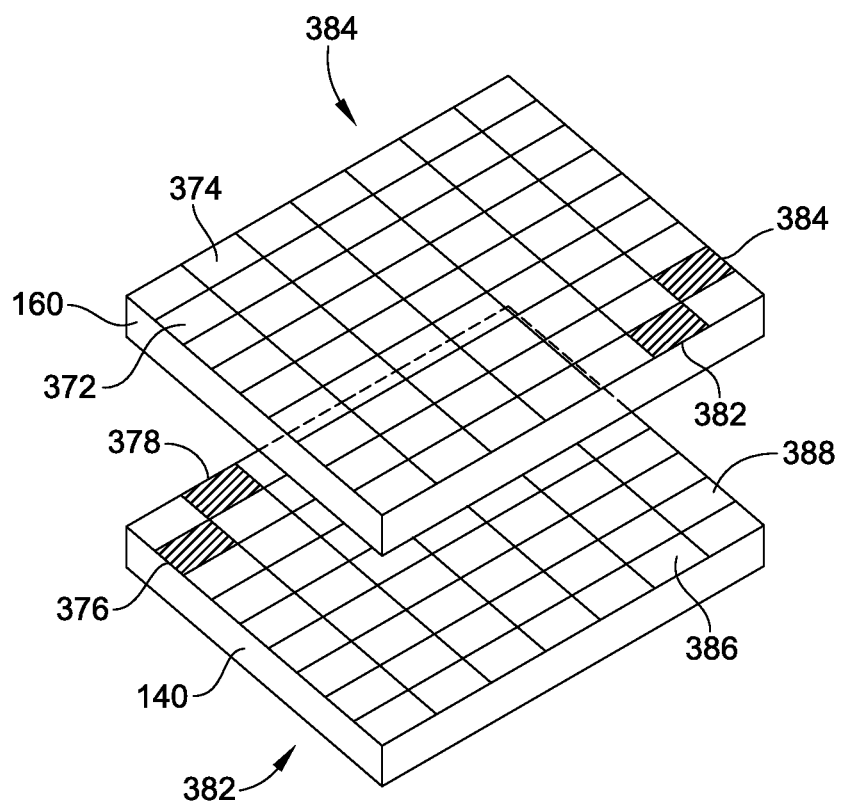
FIG. 12 shows another illustrative example of two display units configured into a single display package so that one overlays the other.

In another illustrative embodiment shown in FIG. 12, the diffuse reflecting display unit layer 160 overlays backlit display unit layer 140. Each layer defines a grid 382 and 384 of vertical and horizontal lines forming a checkerboard of square areas. Some but not all of the square areas in each layer would serve as active pixels for the display provided by the layer. For example, FIG. 12 shows two pixels of the diffuse reflecting layer 372, 374 to be active (i.e., capable of reflecting information) while corresponding pixels of the LCD layer 376, 378 lying directly beneath pixels 372, 374 are shown to be inactive (i.e. no back light shines through pixels 376, 378 to interfere with the active overhead pixels 372, 374). Similarly, two pixels of the diffuse reflecting layer 382, 384 are shown be inactive (i.e., transparent to allow LCD lighting from below these pixels to pass through) while corresponding pixels of the LCD layer 386, 388 directly beneath pixels 382, 384 are shown to be active (i.e., gateably capable of displaying LCD display information). In this way, the pixels of each layer can be alternatively activated by the processor so that neither layer interferes with the other layer when displaying information outwardly from the display device.

As yet another illustrative embodiment, the inactive pixels 382, 384 in the reflective layer 160 shown in FIG. 12 may be configured to be neither active pixels, nor inactive pixels. Rather, pixels 382, 384 may be configured to be "transparent" pixels. In this embodiment, the information in the pixels in lower LCD layer 140 that line up with the transparent pixels in the reflective layer would shine right through the transparent pixels without any need for activation or deactivation of the pixels 382, 384. These "transparent" pixels thus form gaps between active/inactive pixels that are transparent to the backlight. It will be appreciated that the "transparent" pixels may be located in various configurations across the checkerboard shown in FIG. 12 depending upon the desired display effect. For instance, in one configuration, one "transparent pixel" may be located between two active pixels across the checkerboard of pixels that make up the layer. In another configuration, a plurality of transparent pixels may be located between two active pixels across the checkerboard of pixels in order to allow for more backlighting effect. In yet another configuration, in one or more parts of the checkerboard, one or more transparent pixels may be located between active pixels while in a second part or parts of the checkerboard, a different number of transparent pixels may be located between active pixels of the checkerboard, and in a third part or part, there may be no transparent pixels between adjacent active pixels. In these and other ways, transparent pixels may be used to allow for more or less backlighting to shine through reflective layer 160 to produce the desired combination of backlighting or reflective lighting display effects from mobile computing device. In these and other ways, individual pixels or sectors of pixels may be configured to be transparent.

Referring again to FIG. 1, display panel interface 110 may be any hardware and/or hardware/software components that detect a property for activating a display type. The processor 104 is configured to send information to be displayed to the first display unit 140 or the second display unit 160 depending on the display type property detected. Illustratively, the display panel interface is a touch activated sensor and the property detected for activating the display type is a touch detected by the sensor.

Figure 13:
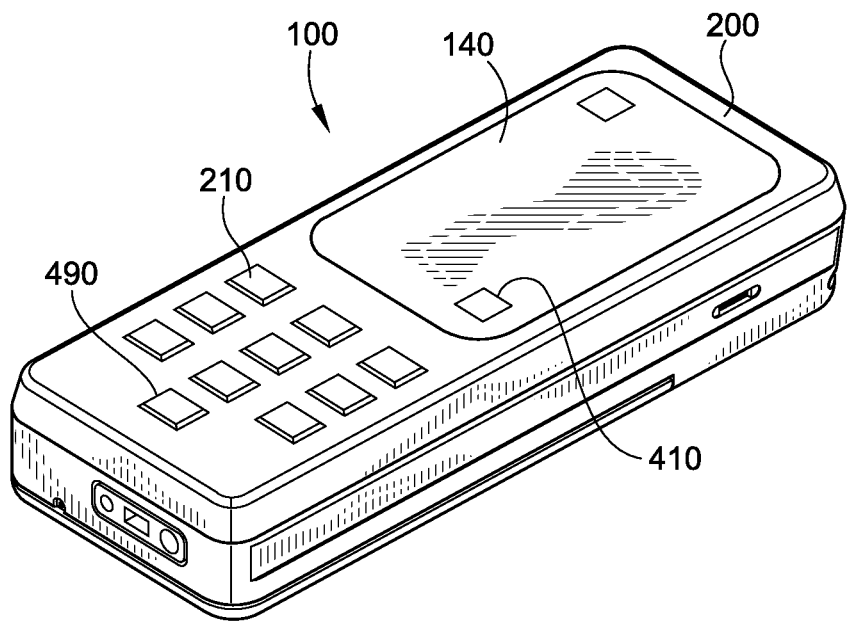
FIGS. 13 and 14 show illustrative embodiment similar to FIGS. 6 and 7 further comprising a first touch activated sensor on a first display unit and a second touch activated sensor on a second display unit.
Figure 14:
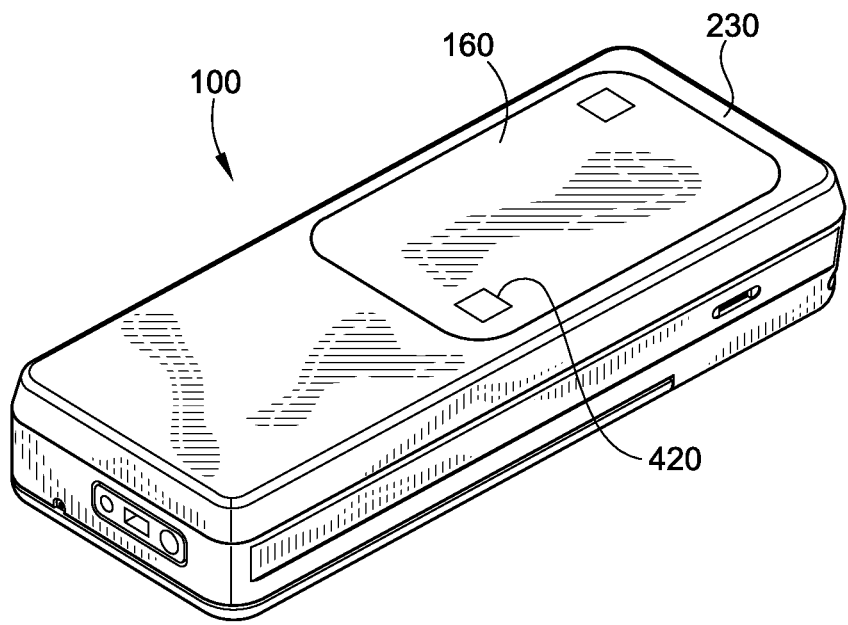

FIGS. 13 and 14 show one illustrative embodiment of this disclosure. FIGS. 13 and 14 are similar to FIGS. 6 and 7 and the description of elements that are described in connection with FIGS. 6 and 7 and that are common to FIGS. 13 and 14 are applicable to the like elements appearing in FIGS. 13 and 14. The mobile computing device of FIGS. 13 and 14 further comprise a first touch activated sensor 410 associated with the first display unit 140 and a second touch activated sensor 420 associated with the second display unit 160. The previously described touch detected by the touch activated sensor is in this case a touch detected by the first touch activated sensor 410 or a touch detected by the second touch activated sensor 420. The touch detected by the first touch activated sensor activates the first display unit 140 and the touch detected by the second touch activated sensor activates the second display unit 420 in this embodiment.

In an illustrative embodiment using a single touch activated sensor, the display panel activated by the display panel interface on detection of a touch by the touch activated sensor may depend upon the form of the touch. The form of the touch may be the number of times that the touch activated sensor is touched. For example, a first number of times of touch of the touch activated sensor, such as one touch, may activate the first display unit and a second number of times of touch of the touch activated sensor, such as two touches, may activate the second display unit. Alternatively, the form of the touch may be the number of fingers that touch the touch activated sensor. For example, a first number of fingers, such as one finger, touching the touch activated sensor may activate the first display unit and a second number of fingers, such as two fingers, touching the touch activated sensor may activate the second display unit.

In another illustrative embodiment, the display panel interface is a gravity detection device 490, such as an accelerometer, and the property detected for activating the display type depends on which of the first display unit or the second display unit is facing in the upward direction. In one example, accelerometer 490 is configured to detect whether the front side 200 of mobile computing device 100 is facing up. The LCD display panel 140 is activated if the front side of the mobile computing device is facing up. The diffuse reflecting display panel 160 is activated if the back side of the mobile computing device is facing up. In this way, the display that the user positions to face upward is activated by the display panel interface since the accelerometer detects that display to be in the upward position.

Touch, number of touches, number of fingers touching, upward and downward position of a mobile computing device or a display unit, soft keys, etc. are some of the properties that the display panel interface may detect for activating a display type. Other properties including any property, physical, mechanical, electrical, chemical, or other property that is detectable for use in selecting a display unit.

The mobile computing device shown in FIG. 1 may further comprise a display controller having display controller settings. The processor may be configured to update the display controller based on the display type property detected. In addition the mobile computing device may further comprise a memory configured to store properties of the backlit display and the diffuse reflecting display.

Figure 15:
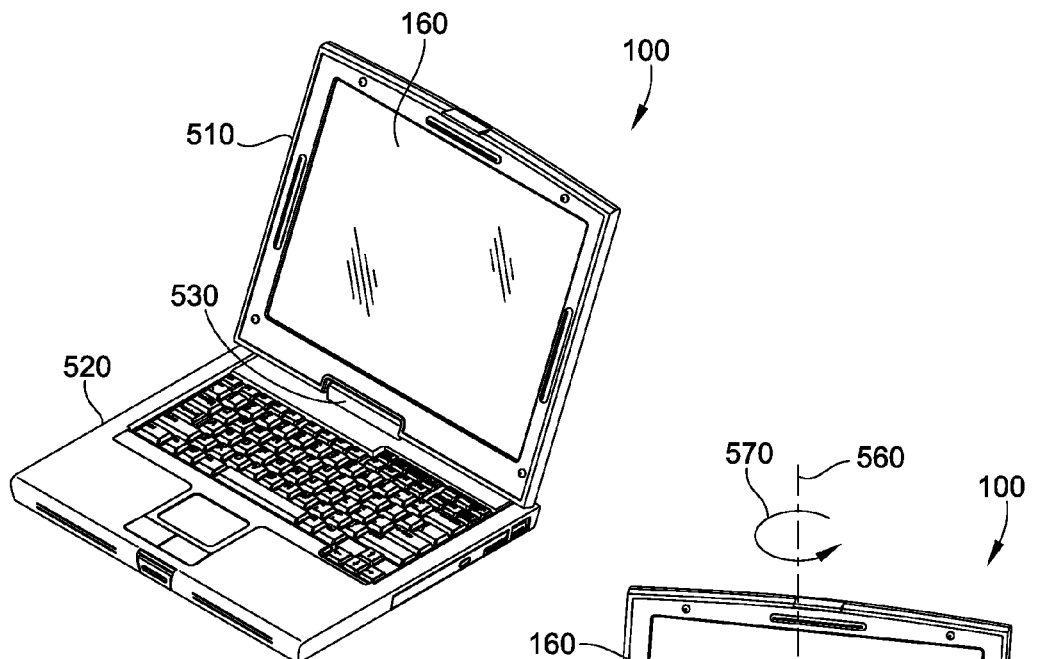
FIGS. 15, 16, 17 illustrate a mobile computing device in the form-factor of a claim-shell in three different positions showing various illustrative benefits of the mobile computing device configured to have two display units.
Figure 16:
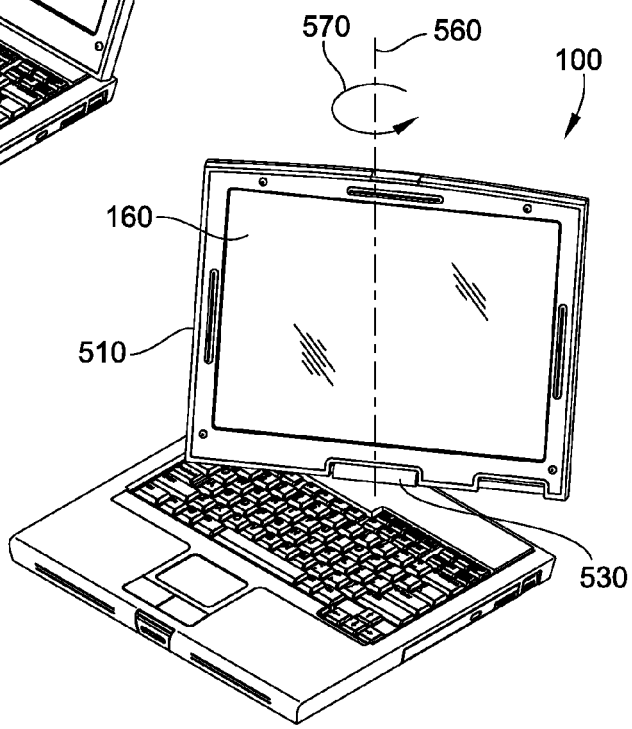
Figure 17:
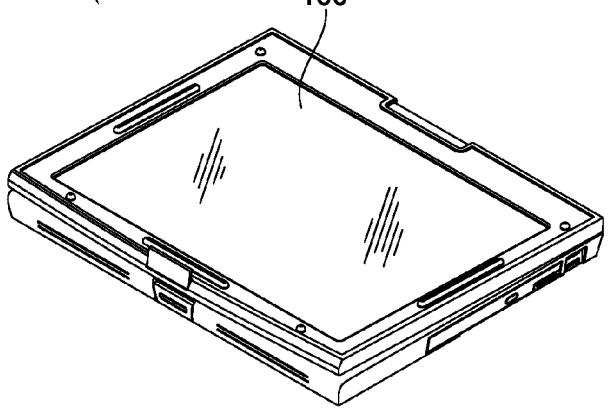

FIGS. 15, 16, 17 illustrate the same mobile computing device 100 in the form-factor of a claim-shell in three different positions. Illustratively, the mobile computing device is a laptop computer but the mobile computing device may be other types of mobile computing devices. As shown in FIG. 15, the mobile computing device comprises a display part 510, a keyboard part 520, and a swivel member 530 connecting the display part to the keyboard part of the mobile computing device to allow the display part of the mobile computing device to rotate about the swivel member when the display part is substantially orthogonal to the keyboard part of the mobile computing device. As shown in the FIGS, the first display unit 140 and the second display 160 unit reside in the display part of the mobile computing device. Advantageously, the swivel member 530 allows either the first display unit or the second display unit to face in the direction of the keyboard part of the mobile computing device for use in a first set of operations. In FIG. 15, display unit 160 is facing the keyboard part of the mobile computing device.

FIG. 16 shows the display panel 510 having swiveled about 270 degrees 570 about the orthogonal axis 560 formed by the swivel member 530 such that the LCD display unit 140 is now almost facing the direction of the keyboard. Advantageously, when the LCD display unit is facing the user, this allows the user to perform a first set of operations using the LCD display panel. In addition, the display unit 160 facing away from the keyboard part of the mobile computing device enables use of the facing away display unit in a second set of operations. For example, another person may read a book on the diffuse reflecting display of display unit 160 while a first person may be using the LCD display 140 to perform sophisticated computing applications.

FIG. 17 shows the display unit 160 facing away from the keyboard part of the mobile computing device configured to be the display face of the mobile computing device when the display part is closed onto the keyboard part of the mobile computing device. Advantageously, the display face of the mobile computing device when the display part is closed onto the keyboard part of the mobile computing device may serve as a tablet. If the mobile computing device is a laptop computer, this feature enables the laptop computer to be transformed into a tablet in accordance with this disclosure. A claim-shell mobile smart phone may provide a smaller tablet when the phone is configured according to this disclosure.

Figure 18:
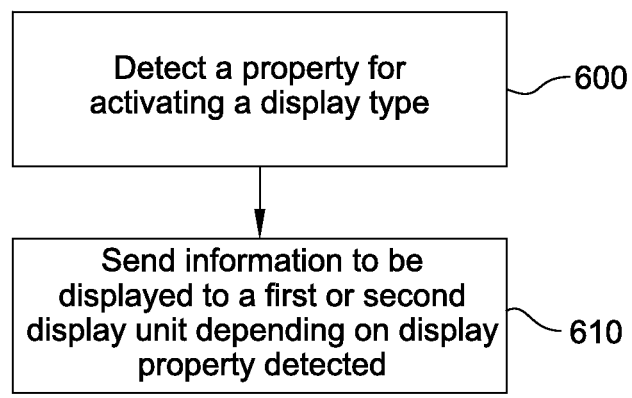
FIGS. 18 and 19 show illustrative processes for operating a mobile computing device configured to have two display units according to this disclosure.

Another powerful use of the externally facing display face of the mobile computing device both when the externally facing display face is orthogonal to the keyboard part of the mobile computing device or even after the display part is closed onto the keyboard part of the mobile computing in the prior example is that the display face becomes the "face" of the mobile computing device to those on the other side of the keyboard of the mobile computing device that are facing the externally facing display. Hence, the outwardly facing display may be used to display text or an image that may provide the mobile computing device with an identity or signature. The face may display a color or a message and the colors, messages, etc. may change after one or more predetermined time periods. Users, such as teenagers may use the face to display messages to other teenagers at the same time that they are using the inwardly facing display for a specific purpose. The disclosure thus allows communication with others using the externally facing display unit "face" of the mobile computing device. The face may provide a messaging board for use in communicating messages from the externally facing display unit in the previously described second operation to others while the user is performing the previously described first set of operations using the display unit that is facing the keyboard. In another example, the face may be used for advertising; wherein the externally facing display unit may serve, for example, as a billboard both when the externally facing display face is orthogonal to the keyboard part of the mobile computing device or even after the display part is closed onto the keyboard part of the mobile computing In a method of displaying information from a mobile computing device of this disclosure as shown in FIG. 18, the method, comprises the step of: detecting a property for activating a display type 600; and sending information to be displayed to a first display unit or a second display unit depending on the display type property detected 610. The method may further comprise the steps of: configuring the first display unit to provide a backlit display; and configuring the second display unit to provide a diffuse reflecting display.

The property detected for activating the display type may be a touch. The property detected for activating a display type may be the relative position of the first display unit and the second display unit.

The method may further comprise the steps of: providing a display controller having display controller settings, and configuring a processor to update the display controller based on the display type property detected. The may further comprising the steps of: configuring a memory to store properties of the backlit display and the diffuse reflecting display.

The method may further comprise the step of: configuring the mobile computing device to be a hand held terminal, a laptop computer, a smart phone, an industrial hand held terminal, or an industrial hand held terminal with scanner. The method may further comprise the step of configuring the second display unit to serve as a mouse. Alternatively, the second display unit may be configured to serve as a mouse pad.

The method may further comprise the further step of: locating the first display unit on a first side of the mobile computing device; and locating the second display unit on a second side of the mobile computing device. The first side of the computing device may be the front of the mobile computing device and the second side of the computing device may be the back of the computing device. The method may further comprise the step of: configuring the second display unit to serve as a mouse. Alternatively, the second display unit may be configured to serve as a mouse pad. In addition, the method may further include the step of leaving the visual display on or turning the visual display off.

The method may further comprise the step of: locating the first display unit and the second display unit on the same side of the mobile computing device. The side of the mobile computing device on which the first display unit and the second display unit are located may be the front side of the mobile computing device.

The method may further comprise the steps of: integrating the first display unit configured to provide a back lit display and the second display unit configured to provide a diffuse reflecting display into a single display unit so that one display unit overlays the other display unit.

The method may further comprise the step of: configuring the e-ink display of the second display to display a dashboard of information.

Figure 19:
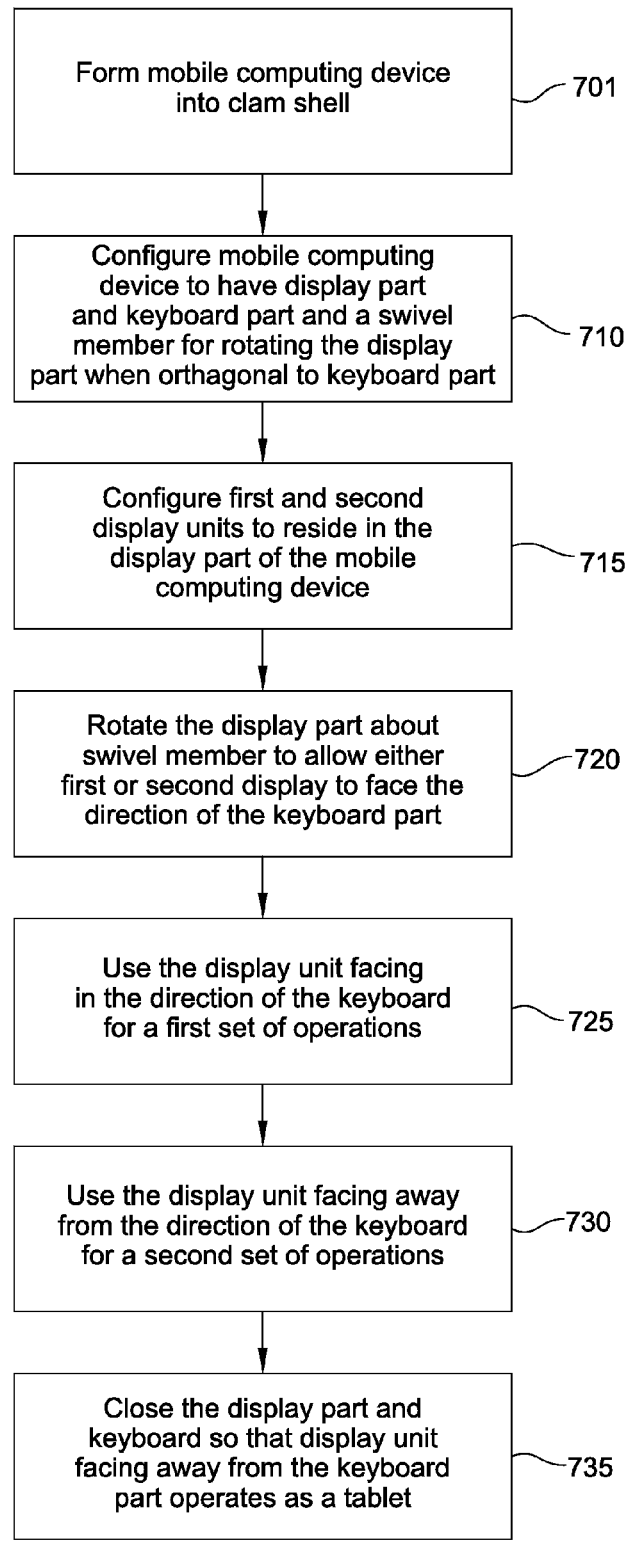

FIG. 19 shows a method comprising the step 701 of forming the mobile computing device in the form factor of a claim-shell, configuring 710 the mobile computing device to include a display part, a keyboard part, and a swivel member connecting the display part to the keyboard part of the mobile computing device to allow the keyboard part of the mobile computing device to rotate about the swivel member when the display part is substantially orthogonal to the keyboard part of the mobile computing device; configuring 715 the first display unit and the second display unit to reside in the display part of the mobile computing device; and rotating 720 the first display unit or the second display unit of the display part about the swivel member when the display part is in a position orthogonal to the keyboard part to allow either the first display unit or the second display unit to face in the direction of the keyboard part of the mobile computing device for use in a first set of operations 725.

The method may further comprise the step 730 of: using the display unit facing away from the keyboard part of the mobile computing device in a second set of operations. The second set of operations on the display unit facing away from the keyboard part of the mobile computing device may be performed contemporaneously with the first set of operations.

The method may further comprising the step of using the display unit facing away from the keyboard part of the mobile computing device to be the display face of the mobile computing device when the display part is closed onto the keyboard part of the mobile computing device.

The method may further comprise the step of configuring the display face of the mobile computing device when the display part is closed onto the keyboard part of the mobile computing device to operate as a tablet.

While the LCD display unit and the e-ink display units in the illustrative examples have been indicated to be on a certain side of the mobile computing device, it will be appreciated that the positions of the display units may be switched. For example, where in FIGS. 6, 7, the LCD display panel is disclosed to be facing the front of the mobile computing device and the e-ink display facing the back side of the mobile computing device, it will be appreciated that the positions of the display units can be switched. More specifically, in this example, the e-ink display panel can be configured to face the front of the mobile computing device and the LCD display unit configured to face the back side of the mobile computing device. Configuring the mobile computing device in this way may be particularly advantageous where the primary function of the mobile computing device is as an e-reader. Hence, the front side of the e-reader allows the user to read information displayed from the e-ink display while the back side of the e-reader provides the user with an LCD display to perform more sophisticated computing applications.

As another example, the one display unit may be located along a lateral side of the mobile computing device while the other display unit may be located along a front or back side of the mobile computing device such as the front side of the device. Where the display unit located along the lateral side of the mobile computing device is an LCD display configured to serve as a mouse or mouse pad, this configuration of two display units provides another ergonomic variable that may be used to expand the use of the mobile computing device to wider applications.

It will be apparent to those skilled in the art that various modifications and variations can be made to the disclosed device and method. Other embodiments will be apparent to those skilled in the art from the consideration of the specification and practice of the disclosed device and method. It is intended that the specification and examples be considered as exemplary only, with a true scope being indicated by the following claims and their equivalents.

What is claimed is:

1. A handheld terminal with barcode scanning functionality comprising;
    a processor;
    a scanner configured to scan a barcode;
    a first display unit configured to provide a backlit display connected to the processor;
    a second display unit configured to provide a diffuse reflecting display connected to the processor and display a dashboard of information with life data of the handheld terminal that is always visible on account of the diffuse reflecting display holding its data;
    a display panel interface configured to detect a property for activating a display type;
    wherein the processor is configured to send information to be displayed to the first display unit or the second display unit or both depending on the display type property detected;
    wherein the display panel interface is a sensor and the property detected for activating the display type is a property detected by the sensor;
    wherein the handheld terminal further comprises a display part, a keyboard part, and a swivel member connecting the display part to the keyboard part of the handheld terminal to allow the display part of the handheld terminal to rotate about the swivel member when the display part is substantially orthogonal to the keyboard part of the handheld terminal;
    wherein the first display unit and the second display unit reside in the display part of the handheld terminal; and
    wherein the swivel member allows either the first display unit or the second display unit to face in a direction of the keyboard part of the handheld terminal for use in a first set of operations.

2. The handheld terminal with barcode scanning functionality of claim 1 wherein the diffuse reflecting display is based on e-ink technology.

3. The handheld terminal with barcode scanning functionality of claim 1:
    wherein the sensor is a touch activated sensor comprising a first touch activated sensor associated with the first display unit and a second touch activated sensor associated with the second display unit,
    wherein the touch detected by the touch activated sensor is a touch detected by the first touch activated sensor or a touch detected by the second touch activated sensor, and
    wherein the touch detected by the first touch activated sensor activates the first display unit and the touch detected by the second touch activated sensor activates the second display unit.

4. The handheld terminal with barcode scanning functionality of claim 1 wherein the display panel interface is a gravity detecting device, and the property detected for activating the display type depends on which of the first display unit or the second display unit is facing in an upward direction.

5. The handheld terminal with barcode scanning functionality of claim 1, further comprising a memory configured to store properties of the backlit display and the diffuse reflecting display.

6. The handheld terminal with barcode scanning functionality of claim 1, wherein the second display unit is configured to serve as a mouse pad or a mouse.

7. The handheld terminal with barcode scanning functionality of claim 1 wherein the first display unit and the second display unit are located on a front side of the handheld terminal.

8. The handheld terminal with barcode scanning functionality of claim 1 wherein the second display unit configured to provide diffuse reflecting display overlays the first display unit configured to provide a back lit display.

9. The handheld terminal with barcode scanning functionality of claim 1 wherein the first display unit configured to provide a back lit display overlays the second display unit configured to provide a diffuse reflecting display.

10. The handheld terminal with barcode scanning functionality of claim 1 wherein the display unit facing away from the keyboard part of the handheld terminal is used in a first set of operations.

11. The handheld terminal with barcode scanning functionality of claim 10: wherein the display unit facing toward the keyboard part of the handheld terminal is used in a second set of operations.

12. The handheld terminal with barcode scanning functionality of claim 11:
    wherein the second set of operations that are being performed using the display unit facing toward the keyboard part of the handheld terminal are performed contemporaneously with the first set of operations that are being performed using the display unit facing away from the keyboard part of the handheld terminal.

13. The handheld terminal with barcode scanning functionality of claim 11 wherein the display unit facing away from the keyboard part of the handheld terminal is configured to provide the display face of the handheld terminal when the display part is closed onto the keyboard part of the handheld terminal.

14. The handheld terminal with barcode scanning functionality of claim 13 wherein the display face of the handheld terminal serves as a tablet when the display part is closed onto the keyboard part of the handheld terminal.

15. A method of displaying information from a handheld terminal with barcode scanning functionality, comprising:
    detecting a property for activating a display type;
    sending information to be displayed to a first display unit configured to provide a backlit display or a second display unit configured to provide a diffuse reflecting display depending on the display type property detected;
    wherein the property detected for activating a display type is a touch;
    wherein the second display unit is configured to display a dashboard of information with life data of the handheld terminal that is always visible on account of the diffuse reflecting display holding its data;
    configuring the handheld terminal to include a display part, a keyboard part, and a swivel member connecting the display part to the keyboard part of the handheld terminal to allow the keyboard part of the handheld terminal to rotate about the swivel member when the display part is substantially orthogonal to the keyboard part of the handheld terminal;

configuring the first display unit and the second display unit to reside in the display part of the handheld terminal; and rotating the first display unit or the second display unit of the display part about the swivel member when the display part is in a position substantially orthogonal to the keyboard part to allow either the first display unit or the second display unit to face in a direction of the keyboard part of the handheld terminal for use in a first set of operations.

* * * * *